(12) United States Patent
Sakai (10) Patent No.: US 10,091,712 B2
(45) Date of Patent: Oct. 2, 2018

(54) COMMUNICATION DEVICE, METHOD FOR CONTROLLING COMMUNICATION DEVICE, AND PROGRAM

(71) Applicant: CANON KABUSHIKI KAISHA, Tokyo (JP)

(72) Inventor: Tatsuhiko Sakai, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 46 days.

(21) Appl. No.: 14/785,837

(22) PCT Filed: Mar. 31, 2014

(86) PCT No.: PCT/JP2014/001886
§ 371 (c)(1),
(2) Date: Oct. 20, 2015

(87) PCT Pub. No.: WO2014/174769
PCT Pub. Date: Oct. 30, 2014

(65) Prior Publication Data
US 2016/0066256 A1    Mar. 3, 2016

(30) Foreign Application Priority Data
Apr. 24, 2013 (JP) .................. 2013-091421

(51) Int. Cl.
*H04W 76/02* (2009.01)
*H04W 48/16* (2009.01)
(Continued)

(52) U.S. Cl.
CPC .......... *H04W 48/16* (2013.01); *H04W 8/005* (2013.01); *H04W 8/22* (2013.01); *H04W 84/12* (2013.01); *H04W 92/18* (2013.01)

(58) Field of Classification Search
None
See application file for complete search history.

(56) References Cited

U.S. PATENT DOCUMENTS

2013/0148149 A1* 6/2013 Park .................. G06F 3/1296
358/1.13
2013/0260683 A1* 10/2013 Suzuki .................. H04W 4/008
455/41.1
(Continued)

FOREIGN PATENT DOCUMENTS

JP  2009-152689 A  7/2009
JP  2011-114377 A  6/2011
(Continued)

*Primary Examiner* — Steven H Nguyen
*Assistant Examiner* — Sithu Ko
(74) *Attorney, Agent, or Firm* — Canon U.S.A., Inc. IP Division (57) ABSTRACT

A communication device includes a reception unit, first and second determination units, and a transmission unit. The reception unit receives a search request signal transmitted from another communication device. The first determination unit determines whether the communication device executes a specific protocol. The second determination unit determines whether information indicating the specific protocol is added to the received request signal. The transmission unit does not transmit a response to the received search request signal, when the communication device executes the specific protocol and the information is not added, or when the communication device does not execute the specific protocol and the information is added, and transmits the response when the communication device executes the specific protocol and the information is added or when the communication device does not execute the specific protocol and the information is not added, based on the determinations made by the first and second determination units.

17 Claims, 5 Drawing Sheets

(51) Int. Cl.
H04W 8/22 (2009.01)
H04W 8/00 (2009.01)
H04W 84/12 (2009.01)
H04W 92/18 (2009.01)

(56) References Cited

U.S. PATENT DOCUMENTS

2013/0265935 A1* 10/2013 Matsuda ............... H04W 76/02
370/315
2014/0153557 A1* 6/2014 Kim .................... H04W 76/023
370/338

FOREIGN PATENT DOCUMENTS

| JP | 2011-135325 A | 7/2011 |
| JP | 2013-005094 A | 1/2013 |
| JP | 2013-42400 A | 2/2013 |

* cited by examiner

COMMUNICATION DEVICE, METHOD FOR CONTROLLING COMMUNICATION DEVICE, AND PROGRAM

TECHNICAL FIELD

The present invention relates to a communication device, a method for controlling the communication device, and a program.

BACKGROUND ART

Recently, a wireless local area network (LAN) function has been installed in an electronic device such as a digital camera and a printer in many cases. Thus, the electronic device is used as a communication device connected to a wireless LAN to be used. For example, a method of installing the wireless LAN function in a digital camera to facilitate image sharing is discussed in Japanese Patent Application Laid-Open No. 2009-152689.

Wi-Fi Alliance has defined a standard, Wi-Fi Direct (registered trademark). In Wi-Fi Direct (hereinafter, referred to as WFD), a protocol for determining whether each of electric devices operates as a wireless LAN access point or a wireless LAN station is defined. By executing the protocol, an electronic device that operates as the wireless LAN access point and an electric device that operates as the wireless LAN station can be automatically determined. With WFD, the electric devices can directly communicate with each other to execute various services (image sharing and printing, for example) without additionally preparing an access point. Thus, high usability is achieved.

When the WFD protocol is executed, a device uses a probe request signal and a probe response signal, as a search request signal and a search response signal defined in IEEE 802.11 standard, to detect a partner device that can execute the protocol.

More specifically, the device executing the WFD protocol (hereinafter, referred to as WFD execution device) transmits the probe request signal and the probe response signal with an information element for WFD as extended information.

The WFD execution device exchanges the probe signal having the additional information element with another WFD execution device. Thus, the partner devices that can execute the WFD protocol can identify each other.

The WFD execution device replies also to a device that is not executing WFD (hereinafter, referred to as non-WFD execution device) by sending the probe response signal, when receiving the probe request signal transmitted from the non-WFD execution device.

Thus, when the non-WFD execution device executing normal wireless LAN scanning processing for searching for a communication destination and the WFD execution device coexist, the non-WFD execution device receives the probe response signal from the WFD execution device.

Thus, the WFD execution device is displayed as a destination candidate on a user interface (UI) of the non-WFD execution device, and a user might accidently select the WFD execution device as the connection destination. As a result, a connection request is transmitted from the non-WFD execution device to the WFD execution device. Such a connection is never established, and thus the user has to reselect the connection destination. Therefore, the usability is low.

In the environment where the WFD execution device and the non-WFD execution device coexist, the non-WFD execution device transmits the probe response signal in response to the probe request signal transmitted from the WFD executing device. Thus, the WFD execution device receives the probe response signal from the non-WFD execution device. Specifically, the WFD execution device hoping to establish a connection with another WFD execution device receives the probe response signal from an unwanted non-WFD execution device.

Thus, the WFD execution device unnecessarily processes the probe response signal from the unwanted non-WFD execution device.

The WFD execution device transmits the probe response signal in response to the probe request signal transmitted from the non-WFD execution device. The non-WFD execution device that has received the probe response signal cannot identify the transmission source as the WFD execution device, and might cause the user to select the WFD execution device as the candidate of the connection destination. As a result, the connection request is transmitted from the non-WFD execution device to the WFD execution device. The connection might not be established due to the lack of capability to execute the WFD protocol. Thus, the processing needs to return to the processing of searching for a communication destination. Therefore, the usability is low.

As described above, in the conventional detection method using the probe signals, the unnecessary processing is executed in the environment where a device that executes certain processing and a device that does not execute the processing, for example, the WFD execution device and the non-WFD execution device, coexist.

CITATION LIST

Patent Literature

PTL 1: Japanese Patent Application Laid-Open No. 2009-152689

SUMMARY OF INVENTION

A communication device, according to an exemplary embodiment of the present invention, includes a reception unit configured to receive a search request signal transmitted from another communication device, a first determination unit configured to determine whether the communication device executes a specific protocol, a second determination unit configured to determine whether information indicating the specific protocol is added to the received search request signal, and a transmission unit configured not to transmit a response to the received search request signal, when the communication device executes the specific protocol and the information is not added to the search request signal, or when the communication device does not execute the specific protocol and the information is added to the search request signal, and to transmit, to the another communication device, the response to the received search request signal when the communication device executes the specific protocol and the information is added to the search request signal, or when the communication device does not execute the specific protocol and the information is not added to the search request signal, based on the determinations made by the first determination unit and the second determination unit.

According to the present invention, unnecessary processing can be prevented from being executed, in an environment where devices that executes and does not execute a specific protocol coexist.

Further features of the present invention will become apparent from the following description of exemplary embodiments with reference to the attached drawings.

DESCRIPTION OF EMBODIMENTS

Various exemplary embodiments, features, and aspects of the invention will be described in detail below with reference to the drawings.

A communication device according to a first exemplary embodiment is described below with reference to the drawings. An example where a wireless LAN system conforming to IEEE 802.11 series is used will be described below. However, the communication mode is not necessarily limited to that using the wireless LAN conforming to IEEE 802.11.

A hardware configuration suitable for the present exemplary embodiment will be described.

Figure 1:
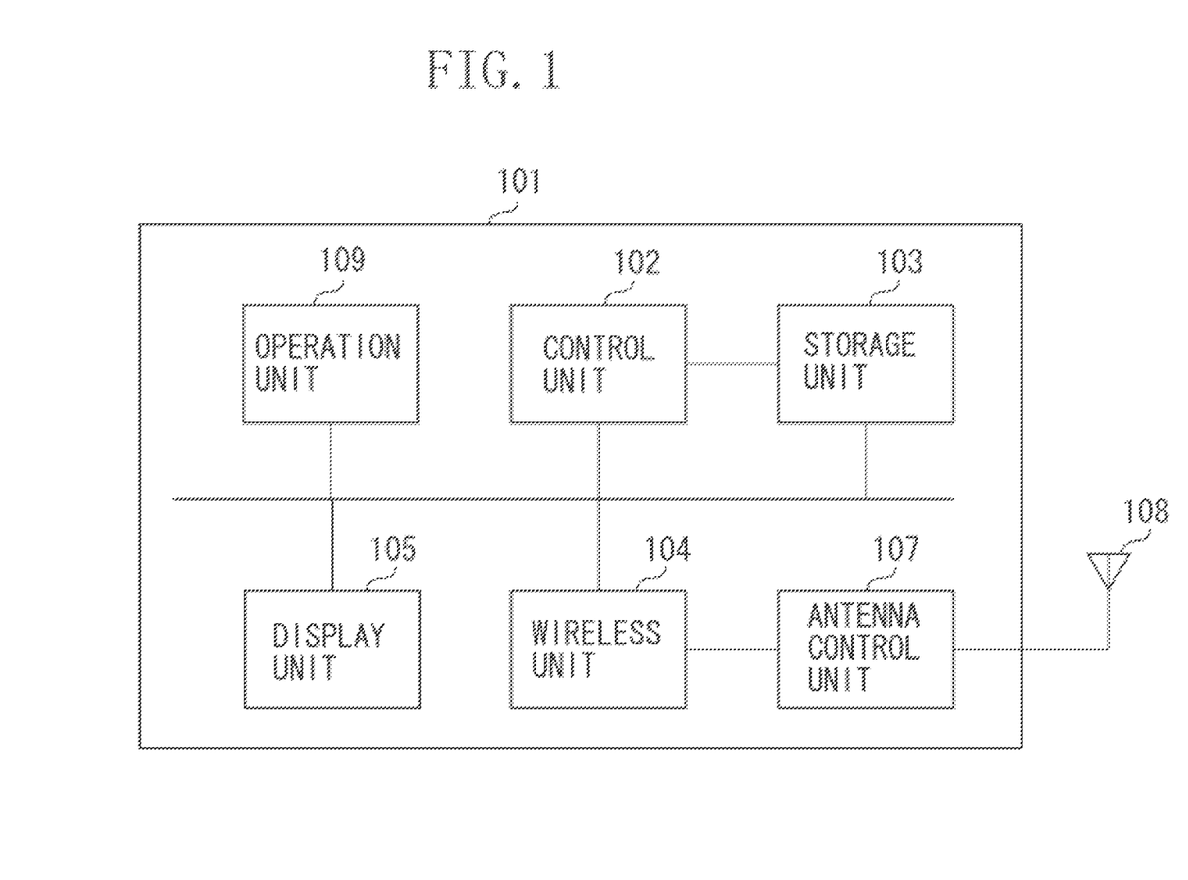
FIG. 1 is a diagram of configuration blocks of a device.

FIG. 1 is a block diagram illustrating an example of the configuration of each device 101 described later according to an exemplary embodiment, to which the present invention can be applied. A control unit 102 executes a control program stored in a storage unit 103 to control the entire device 101. The control unit 102 includes at least one processor such as a central processing unit (CPU) and a microprocessor unit (MPU). The control unit 102 also controls WFD executed with another device. The storage unit 103 stores the control program executed by the control unit 102 and various types of information such as a communication parameter. The storage unit 103 may also store image data and files generated in the communication device or received from an external device. The storage unit 103 includes various types of memories such as a read only memory (ROM), a random access memory (RAM), a hard disk drive (HDD), and a flash memory. The control unit 102 executes the control program stored in the storage unit 103 to execute the various operations described later.

A wireless unit 104 executes wireless LAN communications conforming to IEEE 802.11 series. A display unit 105 displays various types of information, and has a function of a liquid crystal display (LCD) and a laser emitting diode (LED) capable of outputting visually recognizable information, and of a speaker capable of outputting sounds, for example. The display unit 105 has a function of outputting at least one of the visual information and the sound information.

An antenna control unit 107 controls an antenna 108 to transmit and receive a signal through wireless communications. An operation unit 109 is used by a user to perform various inputs to operate the communication device 101. The operation unit 109 includes various buttons and a touch panel.

Figure 2:
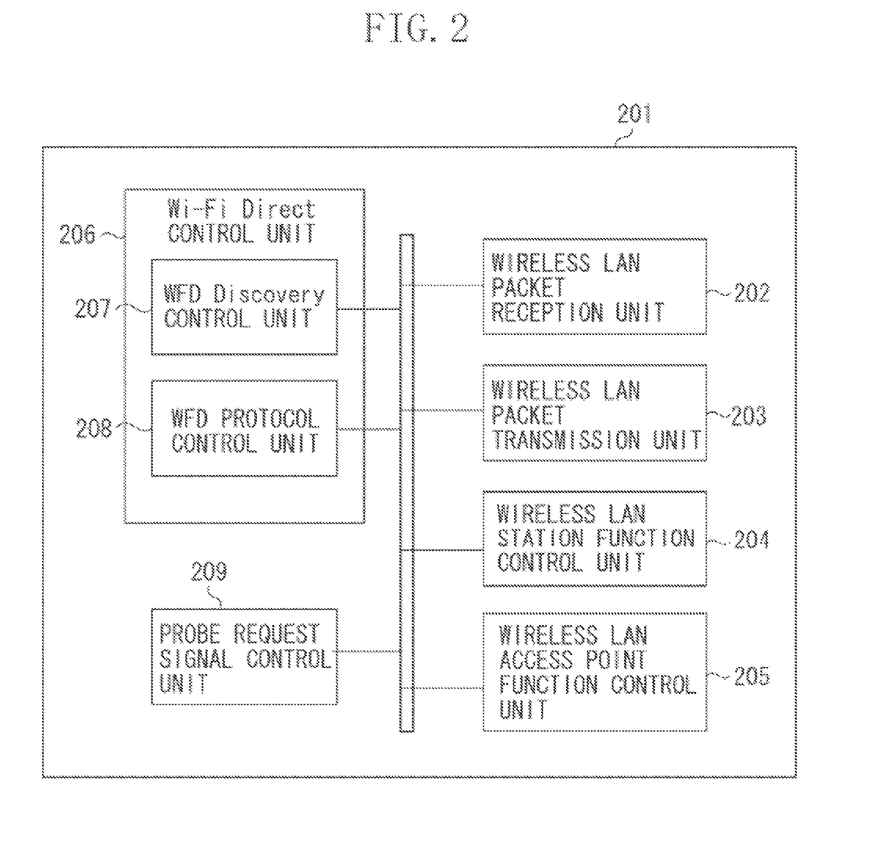
FIG. 2 is diagram of software functional blocks in the device.

FIG. 1 illustrates merely an example. The communication device 101 may have a hardware configuration different from the hardware configuration illustrated in FIG. 1. For example, the communication device 101 as a printer includes a print unit, and the communication device 101 as a camera includes an image capture unit. FIG. 2 is a block diagram illustrating an example of the configuration of a software functional block 201 as an entire software functional block that executes a communication control function described later.

A wireless LAN packet reception unit 202 and a wireless LAN packet transmission unit 203 are in charge of any packet transmission and reception not only in a wireless LAN layer, but also in an upper layer communication protocol.

A wireless LAN station function control unit 204 executes authentication/encryption processing when its own communication device operates as a wireless LAN station. A wireless LAN access point function control unit 205 executes authentication/encryption processing and manages the communication destination device when its own communication device operates as a wireless LAN access point.

In a Wi-Fi Direct processing function block 206, a WFD Discovery control unit 207 controls processing of searching for a communication device as a partner device in WFD processing. The WFD Discovery control unit 207 executes processing of searching for a WFD device described later. A WFD protocol control unit 208 controls functions such as a group owner (GO) Negotiation function, a service discovery function, an Invitation function, a dynamic host configuration protocol (DHCP) function, and a Wi-Fi Protected Setup (WPS) function defined in the WFD standard. The WFD protocol control unit 208 executes WFD protocol processing described later. The communication device 101 is controlled by the Wi-Fi Direct processing block 206 to execute processing based on the WFD specification. Specifically, roles of the communication devices in a wireless layer are determined based on the GO Negotiation function, that is, a device that serves as the wireless access point and a device that serves as the wireless LAN station are determined. In WFD, the communication device that executes the wireless LAN access point function is referred to as a P2P group owner (hereinafter referred to as GO), and the communication device that executes the wireless LAN station function is referred to as a P2P client (hereinafter referred to as CL). When the communication device is GO or the wireless access point, a wireless LAN access point function control unit 211 described later is started. When the communication device is CL or the wireless station, a wireless LAN station function control unit 210 described later is started.

A probe request signal control unit 209 controls processing to be executed when a probe request signal as a search request signal transmitted from another device is received. The probe request signal control unit 209 executes the processing described later, which is executed when the probe request signal is received.

All the functional blocks illustrated in FIG. 2 are not necessarily provided by software, and may be at least partly provided by hardware. The functional blocks illustrated in FIG. 2 are correlated with each other. The functional blocks illustrated in FIG. 2 are merely examples. A plurality of functional blocks may form a single functional block, and any of the functional blocks may be further divided into blocks that execute a plurality of functions.

Figure 3:
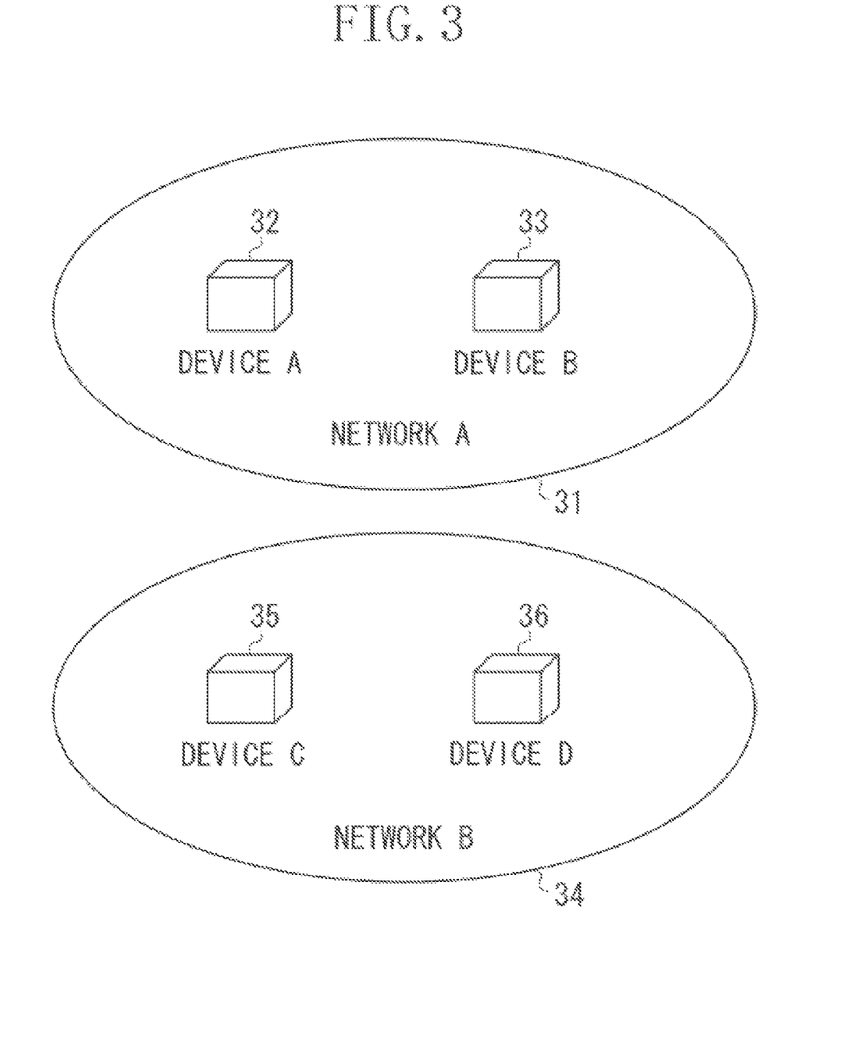
FIG. 3 is a diagram illustrating an example of a network configuration to which the present invention is applied.

FIG. 3 is a diagram illustrating a network system including four communication devices A32, B33, C35, and D36. In FIG. 3, the devices A32 and B33 form a network A31, whereas the devices C35 and D36 form a network B34.

A case is described in the present exemplary embodiment where the WFD processing is executed between the devices A32 and B33, and the device D36 operating as the station device establishes a connection to the device C35 operating as the access point device. It is assumed in this present exemplary embodiment that the device A32 operates as GO as a result of the WFD processing performed between the devices A32 and B33. The devices illustrated in FIG. 3 each have the configuration illustrated in FIGS. 1 and 2.

Figure 4:
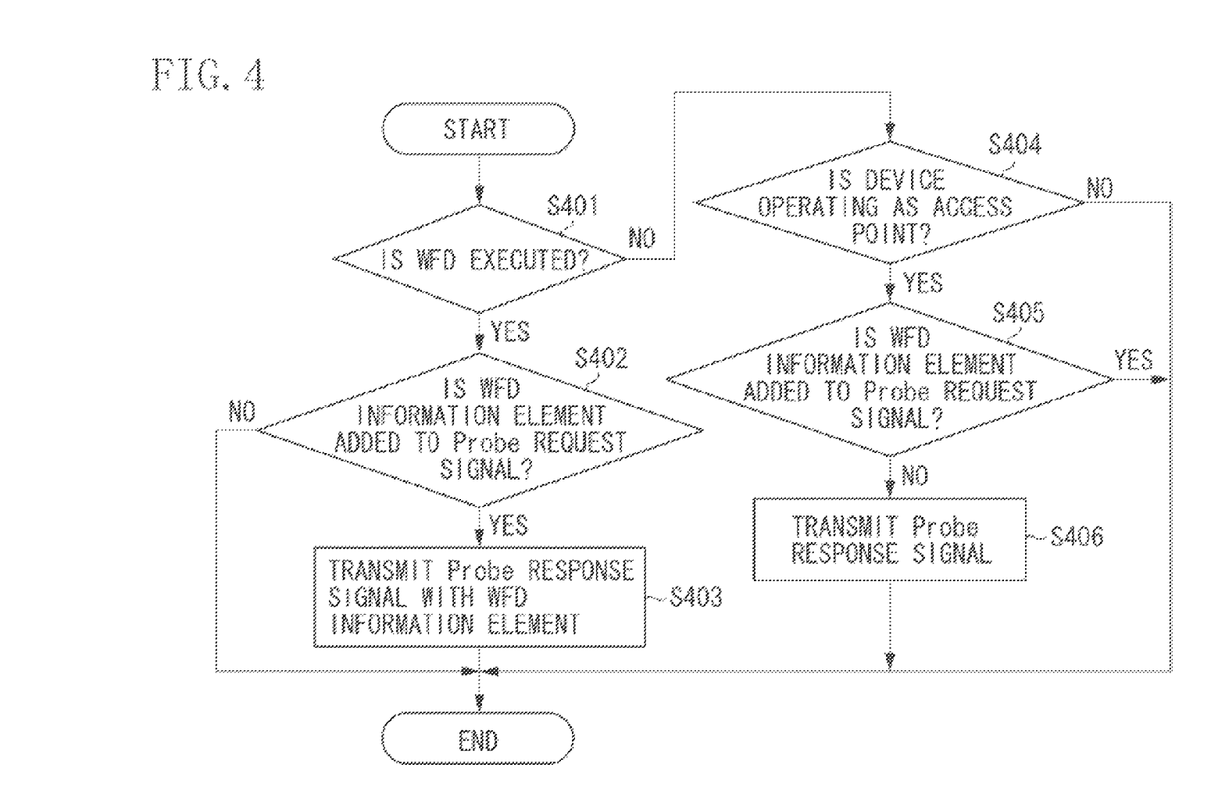
FIG. 4 is a flowchart of operations in an exemplary embodiment of the present invention.

FIG. 4 is flowchart of processing executed when each device receives the probe request signal. The control unit 102 reads out and executes a computer program stored in the storage unit 103 to execute the steps in FIG. 4.

When the probe request signal is received, the probe request signal control unit 209 determines whether its own device is executing the WFD processing, in step S401. Specifically, it is determined whether the device is in a state where execution of the WFD processing is instructed by an operation of the user.

When it is determined that the device is executing the WFD processing in step S401, the probe request signal control unit 209 determines whether the WFD information element is added to the received probe request signal in step S402. The WFD information element is information indicating that the transmission source is executing the WFD. The device that is executing the WFD adds the WFD information element to the probe request signal to be transmitted. The WFD information element is not added to the probe request signal transmitted by the device that is not executing the WFD.

When it is determined that the WFD information element is added to the probe request signal in step S402, the probe request signal control unit 209 starts the WFD Discovery control unit 207. In step S403, the WFD Discovery control unit 207 transmits the probe response signal with the WFD information element added, in response to the received probe request signal.

When it is determined that the WFD information element is not added to the probe request signal in step S402, the probe request signal control unit 209 terminates the processing without transmitting the probe response signal.

When the WFD processing is not executed in step S401, the probe request signal control unit 209 determines whether its own device is operating as the access point in step S404.

When it is determined that its own device is operating as the access point in step S404, the probe request signal control unit 209 determines whether the WFD information element is added to the received probe request signal in step S405.

When it is determined that the WFD information element is not added to the received probe request signal in step S405, the probe request signal control unit 209 starts the wireless LAN access point function control unit 205. The wireless LAN access point function control unit 205 transmits the probe response signal in response to the received probe request signal in step S406.

When it is determined that the WFD information element is added to the received probe request signal in step S405, the probe request signal control unit 209 terminates the processing without transmitting the probe response signal.

The determination processing in the steps in the flowchart of FIG. 4 is examples of first to third determinations in the present exemplary embodiment.

Figure 5:
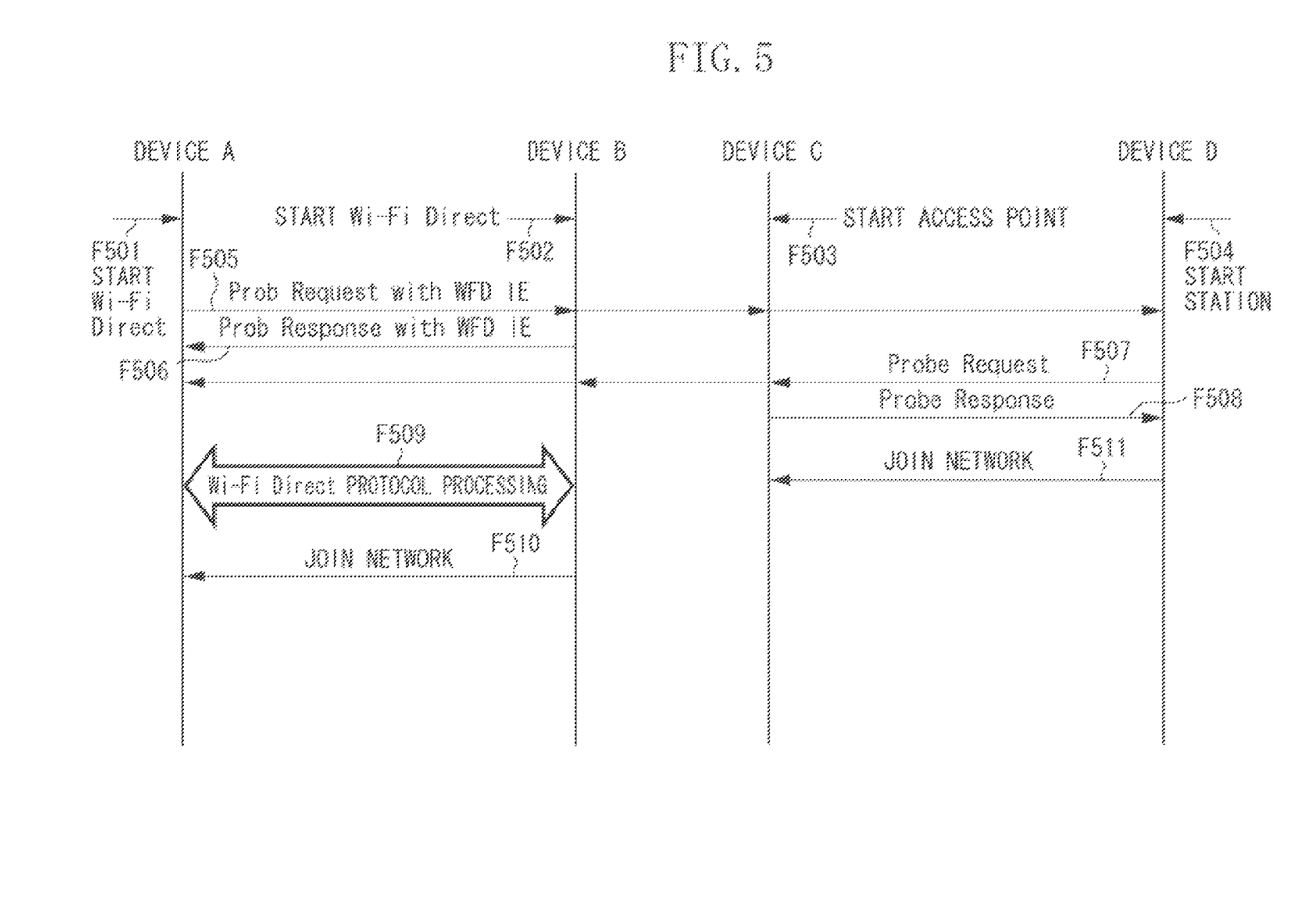
FIG. 5 is a sequence diagram illustrating operations of devices in the exemplary embodiment of the present invention.

FIG. 5 is a sequence diagram of processing executed when the devices A32 and B33 is executing WFD, and the device D36 operating as the wireless LAN station establishes a connection to the device C35 operating as the wireless LAN access point.

First, the devices A32 and B33 start the WFD processing by the operation of the user, in steps F501 and F502. At the same time, the device C35 starts the access point processing and the device D36 starts the station processing respectively in steps F503 and F504.

The device C35, when started as the access point, builds a network B in step F503.

The device A32 transmits the probe request signal with the WFD information element added, to search for the partner device to perform the WFD processing in step F505.

When the devices B33, C35, and D36 receive the probe request signal transmitted from the device A32, only the device B33 transmits the probe response signal to the device A32 in step F506, based on the processing described by referring to FIG. 4.

The device D36 transmits the probe request signal without the WFD information element in step F507, and only the device C35 transmits the probe response signal to the device D36 in response to the probe request signal in step F508.

The device A32 detects that the device B33 is executing the WFD processing from the probe response signal received from the device B33, and the devices A32 and B33 execute the WFD protocol in step F509.

As a result of executing the WFD protocol, the device A32 is determined as GO and builds the network A31 in step F509. The device B33 joins the network A31 built by the device A32 in step F510.

The device D36 detects that the device D36 is operating as the access point from the probe response signal received from the device C35, and joins the network B34 built by the device C35, in step F511.

As described above, the device only responds to an appropriate probe request signal corresponding to its own operating state. Thus, the unwanted probe response signal is less likely to be received, whereby erroneous connection and unnecessary processing can be prevented from occurring. Therefore, high usability is achieved.

The present invention can be applied to a communication service other than WFD in which the information element is added to the probe request signal. Specifically, WFD is merely an example of a specific protocol in the present exemplary embodiment. The protocol may be other protocols, for example, a communication protocol in any layer of the Open Systems Interconnection (OSI) reference model.

According to the present exemplary embodiment, erroneous connection and unnecessary processing can be prevented from occurring even in a case where a plurality of different communication services in an information element which is added to a probe request signal is operating at the same time, whereby higher usability can be achieved.

OTHER EMBODIMENTS

The exemplary embodiment described above is merely an example, and can be modified in various ways without departing from the gist of the present invention.

In step S401 of the exemplary embodiment, whether to proceed to step S402 or step S404 is switched in accordance with the determination on whether the own device is executing WFD. Alternatively, whether its own device supports WFD instead of determining whether the own device is executing WFD, in step S401. Alternatively, the determination may be made depending on whether its own device supports a specific protocol instead of determining whether the own device supports WFD. Here, in steps S402 and S405, instead of whether the WFD information element is added is not determined, it is determined whether the information element indicating the specific protocol is added.

The communication device of the exemplary embodiment described above may be a personal computer (PC), a tablet terminal, a mobile terminal such as a cellphone and a smartphone. Further it may be an image processing device such as a printer, a copier, a digital camera, a multifunctional peripheral, or a digital home electric appliance such as a television set and a recorder.

The above exemplary embodiment is described by taking the wireless LAN conforming to IEEE 802.11 as an example. Alternatively, the present invention may be implemented in other wireless communications of, for example, a wireless USB, multi Band OFDM Alliance (MBOA), Bluetooth (registered trademark), Ultra-Wideband (UWB), and Zigbee (registered trademark). Further, the present invention may be implemented in wire communication media such as wire LAN. UWB includes wireless USB, wireless 1394, and WINET.

The present invention is further realized by executing the following processing. Software (program) for realizing the functions of the exemplary embodiment is supplied to a system or a device through a network or various storage mediums, and the system, a computer (or a CPU or MPU), or the device reads out and executes a program code. In this case, the present invention includes the program and a storage medium storing the program.

Other Embodiment

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)(trademark), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-091421 filed Apr. 24, 2013, which is hereby incorporated by reference herein in its entirety.

The invention claimed is:

1. A communication device comprising:
at least one processor; and
at least one memory storing instructions that, when executed by the at least one processor, cause the at least one processor to function as:
a reception unit configured to receive a probe request signal defined in IEEE 802.11 standard and transmitted from another communication device,
a first determination unit configured to determine whether the communication device executes a specific protocol,
a second determination unit configured to determine whether an information element indicating the specific protocol is added to the received probe request signal,
a third determination unit configured to determine whether the communication device is operating as an access point, and
a transmission unit configured
not to transmit a probe response signal when the information element is not added to the received probe request signal, and to transmit the probe response signal when the information element is added to the received probe request signal, in a case where the first determination unit determines that the communication device is executing the specific protocol,
not to transmit the probe response signal when the information element is added to the received probe request signal, and to transmit the probe response signal when the information element is not added to the received probe request signal, in a case where the third determination unit determines that the communication device is operating as the access point, and
not to transmit the probe response signal to the received probe request signal in a case where the first determination unit determines that the communication device is not executing the specific protocol and the third determination unit determines that the communication device is not operating as the access point.

2. The communication device according to claim 1, wherein execution of the specific protocol is instructed by a user's operation.

3. The communication device according to claim 1, further comprising a communication unit configured to perform communications using a wireless LAN with another communication device.

4. The communication device according to claim 1, wherein the second determination unit performs the determination when the third determination unit determines that the communication device is operating as the access point.

5. The communication device according to claim 3, wherein the wireless LAN is a LAN conforming to IEEE 802.11 series.

6. A method for controlling a communication device, the method comprising:
receiving a probe request signal defined in IEEE 802.11 standard and transmitted from another communication device;
determining, as a first determination, whether the communication device executes a specific protocol;
determining, as a second determination, whether an information element indicating the specific protocol is added to the received probe request signal;
determining, as a third determination, whether the communication device is operating as an access point; and
not transmitting a probe response signal when the information element is not added to the received probe request signal, and transmitting the probe response signal when the information element is added to the received probe request signal, in a case where the first determination determines that the communication device is executing the specific protocol, not transmitting the probe response signal when the information element is added to the received probe request signal, and transmitting the probe response signal when the information element is not added to the received probe request signal, in a case where the third determination determines that the communication device is operating as the access point, and not transmitting the probe response signal to the received probe request signal in a case where the first determination determines that the communication device is not executing the specific protocol and the third determination determines that the communication device is not operating as the access point.

7. The method for controlling a communication device according to claim 6, wherein execution of the specific protocol is instructed by a user's operation.

8. The method for controlling a communication device according to claim 6, further comprising performing communications using a wireless LAN with another communication device.

9. The method for controlling a communication device according to claim 6, wherein the second determination is performed when the third determination determines that the communication device is operating as the access point.

10. The method for controlling a communication device according to claim 8, wherein the wireless LAN is a LAN conforming to IEEE 802.11 series.

11. A non-transitory computer-readable storage medium storing computer executable instructions to cause a computer to execute a method for controlling a communication device, the method comprising:

receiving a probe request signal defined in IEEE 802.11 standard and transmitted from another communication device;

determining, as a first determination, whether the communication device executes a specific protocol;

determining, as a second determination, whether an information element indicating the specific protocol is added to the received probe request signal;

determining, as a third determination, whether the communication device is operating as an access point; and not transmitting a probe response signal when the information element is not added to the received probe request signal, and transmitting the probe response signal when the information element is added to the received probe request signal, in a case where the first determination determines that the communication device is executing the specific protocol, not transmitting the probe response signal when the information element is added to the received probe request signal, and transmitting the probe response signal when the information element is not added to the received probe request signal, in a case where the third determination determines that the communication device is operating as the access point, and not transmitting the probe response signal to the received probe request signal in a case where the first determination determines that the communication device is not executing the specific protocol and the third determination determines that the communication device is not operating as the access point.

12. The communication device according to claim 1, wherein the specific protocol is Wi-Fi Direct.

13. The method for controlling a communication device according to claim 8, wherein the specific protocol is Wi-Fi Direct.

14. The communication device according to claim 1, wherein the transmission unit does not transmit a probe response signal when the information element is not added to the received probe request signal, and transmits the probe response signal when the information element is added to the received probe request signal, in a case where the communication device is executing the specific protocol and is not operating as the access point, and does not transmit the probe response signal when the information element is added to the received probe request signal, and transmits the probe response signal when the information element is not added to the received probe request signal, in a case where the communication device is not executing the specific protocol and is operating as the access point.

15. The communication device according to claim 1, wherein the third determination unit determines whether the communication device is operating as an access point in a case where the first determination unit determines that the communication device is not executing the specific protocol, and does not determine whether the communication device is operating as an access point in a case where the first determination unit determines that the communication device is executing the specific protocol.

16. The method for controlling a communication device according to claim 6, further comprising:

not transmitting a probe response signal when the information element is not added to the received probe request signal, and transmitting the probe response signal when the information element is added to the received probe request signal, in a case where the communication device is executing the specific protocol and is not operating as the access point, and not transmitting the probe response signal when the information element is added to the received probe request signal, and transmitting the probe response signal when the information element is not added to the received probe request signal, in a case where the communication device is not executing the specific protocol and is operating as the access point.

17. The method for controlling a communication device according to claim 6, wherein the third determination is performed in a case where the first determination determines that the communication device is not executing the specific protocol, and is not performed whether the communication device is operating as an access point in a case where the first determination determines that the communication device is executing the specific protocol.

* * * * *